(12) United States Patent
McGregory (10) Patent No.: US 11,943,248 B1
(45) Date of Patent: Mar. 26, 2024

(54) METHODS, SYSTEMS, AND COMPUTER READABLE MEDIA FOR NETWORK SECURITY TESTING USING AT LEAST ONE EMULATED SERVER

(71) Applicant: Keysight Technologies, Inc., Minneapolis, MN (US)

(72) Inventor: Stephen Lee McGregory, Austin, TX (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 586 days.

(21) Appl. No.: 15/947,274

(22) Filed: Apr. 6, 2018

(51) Int. Cl.
| | |
|---|---|
| H04L 9/00 | (2022.01) |
| H04L 9/40 | (2022.01) |
| H04L 41/14 | (2022.01) |
| H04L 43/08 | (2022.01) |
| H04L 43/50 | (2022.01) |
| H04L 61/4511 | (2022.01) |
| H04L 67/02 | (2022.01) |

(52) U.S. Cl.
CPC ........ H04L 63/1433 (2013.01); H04L 41/145 (2013.01); H04L 43/08 (2013.01); H04L 43/50 (2013.01); H04L 61/4511 (2022.05); *G06F 2221/034* (2013.01); *H04L 67/02* (2013.01)

(58) Field of Classification Search
CPC ... H04L 41/145; H04L 63/1433; H04L 43/50; H04L 43/08; H04L 61/1511; H04L 67/02; G06F 2221/034
See application file for complete search history.

(56) References Cited

U.S. PATENT DOCUMENTS

| | | |
|---|---|---|
| 6,898,632 B2 | 5/2005 | Gordy et al. |
| 7,437,474 B2 | 10/2008 | Iyer et al. |
| 7,492,713 B1 | 2/2009 | Turner et al. |
| (Continued) | | |

FOREIGN PATENT DOCUMENTS

| | | |
|---|---|---|
| CN | 102447630 A | 5/2012 |
| EP | 2 850 781 B1 | 6/2019 |
| (Continued) | | |

OTHER PUBLICATIONS

US 8,166,549 B2, 04/2012, Milliken et al. (withdrawn)
(Continued)

*Primary Examiner* — Daniel B Potratz
*Assistant Examiner* — Syed M Ahsan (57) ABSTRACT

Methods, systems, and computer readable media for network security testing using at least one emulated server are disclosed. According to one example method, the method comprises: receiving, from a client device and at an emulated domain name service (DNS) server, a DNS request requesting an Internet protocol (IP) address associated with a domain name; sending, to the client device and from the emulated DNS server, a DNS response including an IP address associated with an emulated server; receiving, from the client device and at the emulated server, a service request using the IP address; sending, to the client device and from the emulated server, a service response including at least one attack vector data portion; and determining, by a test controller and using data obtained by at least one test related entity, a performance metric associated with a system under test (SUT).

17 Claims, 5 Drawing Sheets

(56) References Cited

U.S. PATENT DOCUMENTS

| | | | |
|---|---|---|---|
| 7,505,416 | B2 | 3/2009 | Gordy et al. |
| 7,936,682 | B2 | 5/2011 | Singh et al. |
| 8,326,919 | B1 | 12/2012 | Takkallapally et al. |
| 9,065,723 | B2 | 6/2015 | Stevens et al. |
| 9,117,084 | B2 | 8/2015 | Zecheru |
| 9,473,451 | B2 | 10/2016 | Bondrescu |
| 10,362,057 | B1* | 7/2019 | Wu .................. H04L 63/1491 |
| 10,708,163 | B1 | 7/2020 | Stroud |
| 2001/0013106 | A1 | 8/2001 | Asano |
| 2004/0255167 | A1 | 12/2004 | Knight |
| 2005/0021702 | A1 | 1/2005 | Rangarajan et al. |
| 2006/0109793 | A1 | 5/2006 | Kim et al. |
| 2006/0253906 | A1 | 11/2006 | Rubin et al. |
| 2007/0056038 | A1 | 3/2007 | Lok |
| 2007/0240218 | A1 | 10/2007 | Tuvell et al. |
| 2008/0127335 | A1 | 5/2008 | Khan et al. |
| 2008/0295172 | A1 | 11/2008 | Bohacek |
| 2009/0006841 | A1 | 1/2009 | Ormazabal et al. |
| 2009/0172818 | A1 | 7/2009 | Sutherland et al. |
| 2010/0100963 | A1 | 4/2010 | Mahaffey |
| 2010/0226345 | A1 | 9/2010 | Qu et al. |
| 2011/0058553 | A1 | 3/2011 | Brzozowski |
| 2011/0283140 | A1 | 11/2011 | Stevens et al. |
| 2011/0305241 | A1 | 12/2011 | Yang |
| 2012/0020359 | A1 | 1/2012 | Jiang |
| 2012/0311185 | A1 | 12/2012 | Li |
| 2013/0054762 | A1 | 2/2013 | Asveren |
| 2013/0227170 | A1 | 8/2013 | Zha et al. |
| 2014/0226457 | A1 | 8/2014 | Hsueh et al. |
| 2014/0229615 | A1 | 8/2014 | Hsueh et al. |
| 2015/0040229 | A1* | 2/2015 | Chan .................. G06F 21/577 726/25 |
| 2015/0106670 | A1* | 4/2015 | Gintis ............... H04Q 11/0062 714/712 |
| 2015/0124622 | A1 | 5/2015 | Kovvali et al. |
| 2015/0372980 | A1* | 12/2015 | Eyada ................... G06F 21/55 726/1 |
| 2016/0094632 | A1 | 3/2016 | Jain et al. |

FOREIGN PATENT DOCUMENTS

| | | |
|---|---|---|
| WO | WO-2013/173484 A1 | 11/2013 |
| WO | WO 2014/047548 A1 | 3/2014 |

OTHER PUBLICATIONS

Christophe Tafani-Dereeper, Set up your own malware analysis lab with VirtualBox, INetSim and Burp, Jun. 5, 2017 (Year: 2017).*

Christophe Tafani-Dereeper; Set up your own malware analysis lab with VirtualBox, INetSim and Burp (Year: 2017).*

Christophe Tafani-Dereeper; Set up your own malware analysis lab with VirtualBox, INetSim and Burp "https://blog.christophetd.fr/malware-analysis-lab-with-virtualbox-inetsim-and-purp/#INetSim-2" Published Jun. 5, 2017 (Year: 2017).*

Non-Final Office Action for U.S. Appl. No. 16/035,542 (dated Oct. 4, 2019).

Decision to grant a European patent pursuant to Article 97(1) EPC for European Application Serial No. 13790332.4 (dated May 31, 2019).

Notice of Allowance and Fee(s) Due for U.S. Appl. No. 16/035,542 (dated Apr. 15, 2020).

Decision to refuse a European Patent Application for European Patent Application Serial No. 13 838 955.6 (dated Jun. 1, 2018).

Commonly-assigned, co-pending U.S. Appl. No. 16/035,542 for "Methods, Systems, and Computer Readable Media for Automatic Configuration and Control of Remote Inline Network Monitoring Probe," (Unpublished, filed Jul. 13, 2018).

Waldbusser, "Remote Network Monitoring Management Information Base," RFC 2819, pp. 1-98 (May 2000).

Extended European Search Report for European Application No. 13838955.6 (dated May 27, 2016).

Extended European Search Report for European Application No. 13790332.4 (dated Dec. 11, 2015).

Notice of Allowance and Fee(s) Due for U.S. Appl. No. 13/650,115 (dated Sep. 23, 2015).

Communication of European publication number and information on the application of Article 67(3) EPC for European Application No. 13838955.6 (dated Jul. 1, 2015).

Notice of Allowance and Fee(s) Due & Examiner-Initated Interview Summary for U.S. Appl. No. 13/472,116 (dated Mar. 30, 2015).

Non-Final Office Action for U.S. Appl. No. 13/650,115 (dated Feb. 27, 2015).

Communication of European Publication Number and Information on the Application of Article 67(3) EPC for European Patent Application No. 13790332.4 (dated Feb. 25, 2015).

Non-Final Office Action for U.S. Appl. No. 13/472,116 (dated Aug. 18, 2014).

Notification of Transmittal of the International Search Report and the Written Opinion of the International Searching Authority or the Declaration for International Application No. PCT/US2013/061161 (dated Jan. 16, 2014).

Notification of Transmittal of the International Search Report and the Written Opinion of the International Searching Authority, or the Declaration for PCT International Patent Application No. PCT/US2013/041193 (dated Aug. 23, 2013).

Wing et al., "Port Control Protocol (PCP) draft-ietf-pcp-base-27," pp. 1-107 (Sep. 20, 2012).

Wing et al., "Port Control Protocol (PCP) draft-ietf-pcp-base-26," pp. 1-101 (Jun. 5, 2012).

Wing, "Port Control Protocol," The Internet Protocol Journal, vol. 14., No. 4., pp. 1-32 (Dec. 2011).

IxLoad, "Library updates with baseline traffic captures to measure detection accuracy," IxLoad-Attack: PVM, IxTracker ID: FEA642983, IxLoad 5.40, RT3/2011 Release (Mar. 2011).

Woodyatt, "Recommended Simple Security Capabilities in Customer Premises Equipment (CPE) for Providing Residential IPV6 Internet Service," RFC 6092, pp. 1-36 (Jan. 2011).

Wellington, "Secure Domain Name System (DNS) Dynamic Update," RFC 3007, pp. 1-9 (Nov. 2000).

Vixie et al., "Dynamic Updates in the Domain Name System (DNS Update)," RFC 2136, pp. 1-26 (Apr. 1997).

* cited by examiner

METHODS, SYSTEMS, AND COMPUTER READABLE MEDIA FOR NETWORK SECURITY TESTING USING AT LEAST ONE EMULATED SERVER

TECHNICAL FIELD

The subject matter described herein relates to computer network testing. More specifically, the subject matter relates to methods, systems, and computer readable media for network security testing using at least one emulated server.

BACKGROUND

Network operators typically test network nodes for reliability and other characteristics before deploying the network nodes in live (e.g., non-test) and/or private networks. While testing a network node before deployment may be beneficial, scenarios exist where testing a network node in a live and/or private network is useful and/or necessary, e.g., for detecting and/or resolving previously undetected issues. One potential area of testing may involve network security.

Security devices may be used for protecting data and/or networks. For example, a network-based intrusion prevention system (IPS) may be an inline security device designed to monitor network traffic for malicious traffic such as exploits targeting published vulnerabilities on client and server applications. An IPS generally inspects, identifies, logs, and attempts to block malicious traffic while allowing legitimate or benign traffic to flow between trusted and untrusted network segments. However, incorrect signatures (e.g., IPS filters) defined for an IPS to detect and block traffic considered malicious can lead to incorrectly blocking benign traffic, which can negatively impact end users. Issues can arise when attempting to test an IPS or other security device that requires using one or more network services (e.g., Internet related services).

Accordingly, a need exists for improved methods, systems, and computer readable media for network security testing.

SUMMARY

Methods, systems, and computer readable media for network security testing using at least one emulated server are disclosed. According to one method, the method occurs at a test system implemented using at least one processor. The method comprises: receiving, from a client device and at an emulated domain name service (DNS) server of the test system, a DNS request requesting an Internet protocol (IP) address associated with a domain name; sending, to the client device and from the emulated DNS server, a DNS response including an IP address associated with an emulated server of the test system, wherein the emulated server appears to be associated with the domain name; receiving, from the client device and at the emulated server, a service request using the IP address; sending, to the client device and from the emulated server, a service response including at least one attack vector data portion; and determining, by a test controller of the test system and using data obtained by at least one test related entity, a performance metric associated with a system under test (SUT) that inspects communications between the client device and the emulated server.

According to one system, the system includes at least one processor and a test system implemented using the at least one processor. The system is configured for receiving, from a client device and at an emulated DNS server of the test system, a DNS request requesting an IP address associated with a domain name; sending, to the client device and from the emulated DNS server, a DNS response including an IP address associated with an emulated server of the test system, wherein the emulated server appears to be associated with the domain name; receiving, from the client device and at the emulated server, a service request using the IP address; sending, to the client device and from the emulated server, a service response including at least one attack vector data portion; and determining, by a test controller of the test system and using data obtained by at least one test related entity, a performance metric associated with a SUT that inspects communications between the client device and the emulated server.

The subject matter described herein may be implemented in software in combination with hardware and/or firmware. For example, the subject matter described herein may be implemented in software executed by a processor. In an example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors, network interfaces, and memory.

As used herein, each of the terms "function" and "module" refers to hardware, firmware, or software in combination with hardware and/or firmware for implementing features described herein. In some embodiments, a module may include a field-programmable gateway array (FPGA), an application-specific integrated circuit (ASIC), or a physical processor.

BRIEF DESCRIPTION OF THE DRAWINGS

The subject matter described herein will now be explained with reference to the accompanying drawings of which.

DETAILED DESCRIPTION

Reference will now be made in detail to various embodiments of the subject matter described herein, examples of which are illustrated in the accompanying drawings. Wherever possible, the same reference numbers will be used throughout the drawings to refer to the same or like parts.

Figure 1:
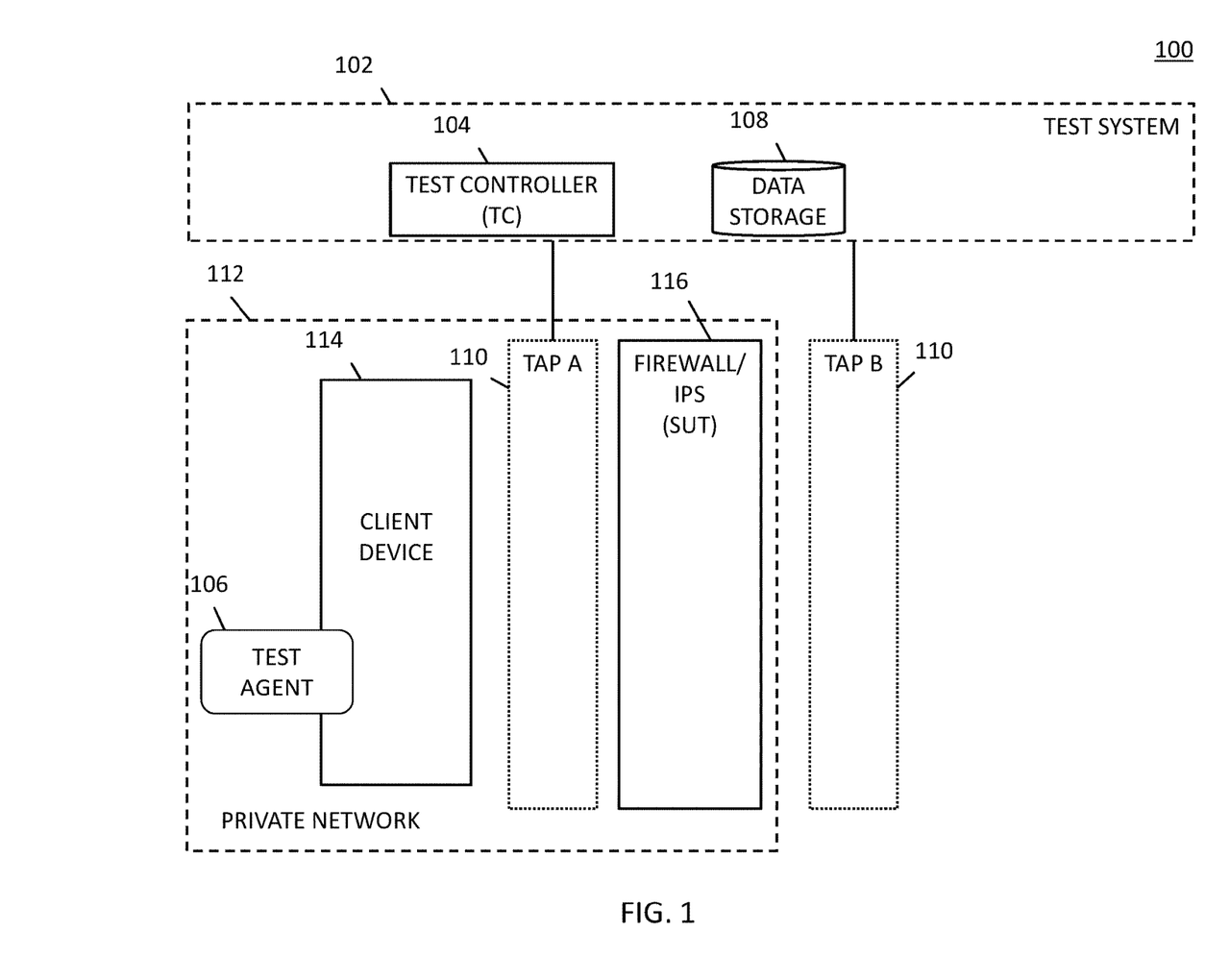
FIG. 1 is a diagram illustrating an example environment for network security testing.

FIG. 1 is a diagram illustrating an example environment 100 for network security testing. Referring to FIG. 1, test environment 100 may include test system 102 and one or more device(s) and/or system(s) under test (SUT) 116. Test system 102 may represent any suitable entity or entities (e.g., one or more computing platforms, nodes, or devices) associated with testing SUT 116 (e.g., one or more security devices). For example, test system 102 may generate and send traffic to SUT 116 and/or receive traffic from SUT 116 and may analyze one or more aspects associated with SUT 116.

SUT 116 may be any suitable entity or entities (e.g., devices, systems, or platforms) for receiving, processing, forwarding, and/or sending one or more messages. In some embodiments, SUT 116 may include one or more security devices, such as a firewall device or an intrusion protection system (IPS). For example, SUT 116 may include a security device (e.g., firewall or an IPS) that inspects traffic that traverses the security device (e.g., Internet protocol (IP) packets and/or network communications). In this example, SUT 116 may include functionality for inspecting various communications for suspicious and/or malicious data (e.g., packets that may include harmful or malicious payloads) and may include functionality for performing mitigation actions to avoid or mitigate the impact of any suspicious and/or malicious data found.

In some embodiments, test system 102 may include a stand-alone tool, a testing device, or software executing on one or more processor(s). In some embodiments, test system 102 may be a single device or node or may be distributed across multiple devices or nodes. In some embodiments, test system 102 may include one or more modules for performing various test related functions. For example, test system 102 may include a traffic generator for generating test traffic and/or monitor taps located in various locations (e.g., surrounding SUT 116) for monitoring communications.

In some embodiments, test system 102 may be configured to communicate and/or interact with private network 112 or portions thereof, e.g., SUT 116. Private network 112 may represent a network that includes a client device 114 and SUT 116. In some embodiments, private network 112 may be a live network usable for providing services or data to end-users. In some embodiments, private network 112 may be a non-live or test network usable for testing purposes.

Test system 102 may include a test controller (TC) 104, a test agent 106, a data storage 108, and one or more taps 110. TC 104 may be any suitable entity or entities (e.g., software executing on a processor, a field-programmable gateway array (FPGA), and/or an application-specific integrated circuit (ASIC), or a combination of software, an FPGA, and/or an ASIC) for performing one or more aspects associated with testing SUT 116 and/or various aspects thereof. In some embodiments, TC 104 may be implemented using one or more processors and/or memory. For example, TC 104 may utilize one or more processors (e.g., executing software stored in memory) to generate test packets for a number of message streams (e.g., flows or sessions). In another example, TC 104 may also utilize one or more processors to perform or initiate (e.g., via test agent 106) various tests and/or analyses involving test packets and/or related responses from SUT 116. In this example, TC 104 may send instructions to test agent 106 that can control (e.g., pause, restart, or stop) a test session.

In some embodiments, TC 104 may include one or more communications interfaces (e.g., one or more receive port modules and one or more transmit port modules) for interacting with users, modules, and/or nodes. For example, port modules may include network interface cards (NICs) or other suitable hardware, firmware, and/or software for receiving or transmitting data via ports (e.g., physical or logical communication end points).

In some embodiments, TC 104 may use one or more communications interfaces for receiving various messages and one or more communications interfaces for sending various messages. Example messages include IP messages, Ethernet frames, Ethernet messages, PDUs, datagrams, UDP messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other TSN related messages.

In some embodiments, TC 104 may include or provide a communications interface for communicating with a user (e.g., a test operator). In such embodiments, a user of TC 104 may be any entity (e.g., an automated system or a device or system controlled or controllable by a human user) for selecting and/or configuring various aspects associated with testing and/or generating testing related metrics. For example, various user interfaces (e.g., an application programming interface (API) and a graphical user interface (GUI)) may be provided for providing configuration information, such as tests to be performed, types of metrics or statistics to be generated, attack vector data portions to be used, and/or other settings.

In some embodiments, one or more user interfaces at TC 104 and test system 102 for testing SUT 116 and/or for providing configuration information may support automation e.g., via one or more programming languages (e.g., python, PHP, etc.), a representation state transfer (REST) API, a command line, and/or a web based GUI. For example, a user or test operator may use a web browser to interact with a web based GUI at TC 104 for programming or configuring one or more aspects for testing SUT 116.

Test agent 106 may be any suitable entity or entities (e.g., software executing on a processor, an ASIC, an FPGA, or a combination of software, an ASIC, and/or an FPGA) for performing one or more aspects associated with testing SUT 116 and/or various aspects thereof. In some embodiments, test agent 106 may be implemented at client device 114 (e.g., a computer or a mobile device) using one or more processors and/or memory. For example, test agent 106 may utilize one or more processors (e.g., executing software stored in memory) to generate test packets for a number of message streams (e.g., flows or sessions).

In some embodiments, test agent 106 may communicate with test system 102 and/or other related entities (e.g., TC 104) to receive test configuration information usable to set up and/or execute one or more test sessions. For example, test configuration information may include a script for generating and sending particular traffic and/or flows to the test participants. In this example, test agent 106 may configure, generate, and/or send, via client device 114, test traffic based on the test configuration information.

In some embodiments, TC 104 and/or test agent 106 may include functionality for accessing data storage 108 or other memory. Data storage 108 may be any suitable entity or entities (e.g., a storage device, memory, a non-transitory computer readable medium, or a storage system) for maintaining or storing information related to testing. For example, data storage 108 may store message capture related information, e.g., time delta information, timestamp related data, and/or other information. In this example, message capture related information may be usable to determine, derive, or compute one or more test related statistics, such time variation metrics for indicating scheduling fidelity.

In some embodiments, data storage 108 may also contain information usable for generating statistics and/or metrics associated with one or more aspects of SUT 116. For example, data storage 108 may contain metrics associated with one or more performance aspects of SUT 116 during one or more test scenarios. In this example, data storage 108 may maintain a particular set of computed metrics for a first test session or message stream and may maintain another set of computed metrics for a second test session or a different message stream. In some embodiments, data storage 108 and/or memory may be located at test system 102, another node, or distributed across multiple platforms or devices.

Taps 110 may be any suitable entities (e.g., a monitoring device, software executing on a processor, etc.) for monitoring and/or copying data that traversing a physical link, a virtual link, or a node (e.g., SUT 116). For example, tap A 110 may be a network tap associated with a link or node that copies messages or portions thereof. In another example, tap A 110 may be monitoring software executing on a network node or switch located between client device 114 and SUT 116.

In some embodiments, taps 110 may be configured to identify and copy relevant messages or data therein based on known network address information (e.g., source address and/or destination address information) or other identifying information. In this example, taps 110 may store copied data (e.g., in data storage 108) and/or may forward copied data to relevant entities (e.g., TC 104).

In some embodiments, TC 104 may analyze communications and/or data obtained by one or more of taps 110 or other test related entities and, using the data, may determine whether SUT 116 has detected and mitigated a suspicious and/or malicious behavior (e.g., an attack vector data portion or related traffic) or may determine whether the suspicious and/or malicious behavior was permitted to impact client device 114 or test agent 106.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity.

Figure 2:
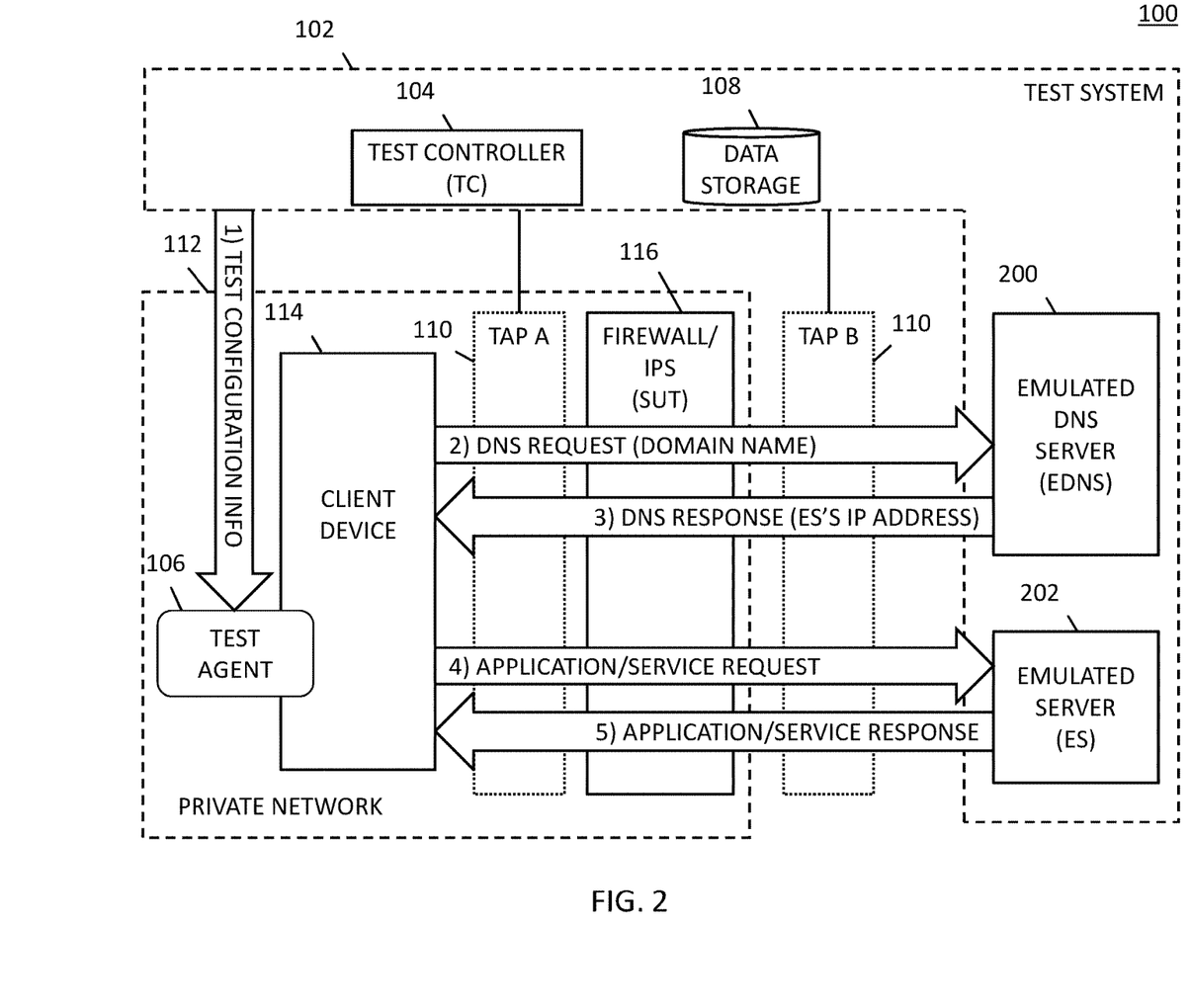
FIG. 2 is a diagram illustrating an example test system for network security testing.

FIG. 2 is a diagram illustrating an example test system 102 for network security testing. In some embodiments, test system 102 may include functionality for emulating various nodes and/or related services. For example, test system 102 or a module thereof may be configured to emulate a DNS server, a web server, an SQL server, and/or an application server and may generate various types of network traffic (e.g., hypertext transfer protocol (HTTP) messages, HTTP secure (HTTPS) messages, SQL messages, representational state transfer (REST) API messages, session initiation protocol (SIP) messages, IP packets, and/or messages) that traverse SUT 116.

By emulating nodes and/or services outside of private network 112, test system 102 and/or TC 104 can test security and/or mitigation aspects of SUT 116 more efficiently and comprehensively. For example, SUT 116 may maintain state about various communication sessions associated with client device 114 and may be configured to use different sets of rules for handling traffic depending on the originator of the traffic. In this example, by emulating a particular server or related application/service, test system 102 and/or TC 104 can test site-, application-, or domain-specific rules at SUT 116, e.g., by determining whether SUT 116 detects and mitigates suspicious and/or malicious traffic (e.g., attack vector data portions) that appears to be from a given site or domain. In another example, SUT 116 may be configured to use more lenient rules for outgoing traffic (e.g., traffic from client device 114 or from nodes internal to private network 112) than for incoming traffic (e.g., traffic from the web or Internet). In this example, by emulating a node or service outside of private network 112, test system 102 and/or TC 104 can test rules at SUT 116 for traffic from sources external to private network 112, e.g., by determining whether SUT 116 detects and mitigates suspicious and/or malicious traffic (e.g., attack vector data portions) that appears to be from external sources.

Referring to FIG. 2, test system 102 may include an emulated domain name service (DNS) server (EDNS) 200 and an emulated server (ES) 202. EDNS 200 may include any suitable entity or entities (e.g., software executing on at least one processor) for emulating one or more servers usable for providing DNS resolution and/or related functions. For example, client device 114 (or test agent 106) may request an IP address associated with 'Twitter.com' by sending a DNS request to EDNS 200. In this example, EDNS 200 may respond to a DNS request with a DNS response containing an IP address that appears (e.g., to SUT 116) to be associated with the domain name 'Twitter.com', but actually is associated with another emulated node (e.g., ES 202).

ES 202 may include any suitable entity or entities (e.g., software executing on at least one processor) for emulating one or more servers for providing an application, a mobile application, a web application or service, and/or other related functionality. For example, ES 202 may emulate an application server, a SQL server, a web server, or another system for providing video over IP (VOIP) service, database access, content delivery, or other services.

In some embodiments, ES 202 may include functionality for providing a web site, media content, and/or a social network related application. In some embodiments, ES 202 may act or appear to be related to a particular domain name, website, or related application/service, e.g., Facebook, iTunes, Google, Twitter, Instagram, etc. For example, ES 202 may communicate with client device 114 using HTTP, HTTPS, SIP, and/or other protocols.

In some embodiments, ES 202 may be configured to send attack vector data portions (e.g., URLs, software, media content, malformed packets, or other data) that could impact (e.g., hijack, infect, harm, or crash) or otherwise compromise a requesting entity (e.g., client device 114) or traversed entity (e.g., SUT 116). For example, TC 104 and/or a test operator may configure ES 202 to send malicious data in HTTP responses, HTTPS responses, SIP responses, REST API responses, IP packets, and/or other communications via various protocols during a test session. In this example, when client device 114 requests a webpage or related content, ES 202 may send an attack vector data portion in a payload portion of one or more response messages.

In some embodiments, TC 104 and/or another test related entity may generate various messages transactions between client device 114 (and/or test agent 106) and ES 202 for testing how SUT 116 responds to various suspicious and/or malicious traffic (e.g., attack vector data portions and/or related messages) traversing SUT 116. For example, during one or more test sessions, ES 202 may be configured to emulate various domains or sites. In this example, ES 202 may send various types of suspicious and/or malicious traffic toward SUT 116. Continuing with this example, TC 104 and/or another test related entity may utilize test related information obtained by taps 110 and/or other test related entities for determining whether SUT 116 has detected and mitigated a suspicious and/or malicious behavior (e.g., an attack vector data portion or related traffic) or for determining whether the suspicious and/or malicious behavior was permitted to impact client device 114 or test agent 106.

Referring to example communications depicted in FIG. 2, test system 102 may be configured to test the performance of SUT 116 deployed to protect private network 112. In some embodiments, TC 104 and test agent 106 may be configured to orchestrate the execution of a network security test case that has been provisioned by a test operator. For example, a test case may include instructions for generating test traffic by test agent 106 that resides at client device 114 in private network 112 protected by SUT 116.

In step 1, TC 104 may provide test configuration information to test agent 106 and may also signal or communicate with test agent 106 to initiate a test session. For example, TC 104 may trigger test agent 106 (e.g., via client device 114) to generate and send test traffic, e.g., a DNS request associated with a destination domain or URL.

In some embodiments, DNS settings in client device 114 and/or test agent 106 may be pre-configured to send DNS requests to EDNS 200 associated with test system 102.

In some embodiments, DNS settings in a router in private network 112 may be pre-configured to send DNS requests to EDNS 200 associated with test system 102.

In step 2, a DNS request may be sent from client device 114 to EDNS 200 via SUT 116. For example, test agent 106 may trigger or otherwise instruct client device 114 to send a DNS request to EDNS 200. In this example, the DNS request may request an IP address associated with a domain (e.g., 'Facebook.com').

In step 3, a DNS response may be sent from EDNS 200 to client device 114 via SUT 116. For example, in response to receiving a DNS request, EDNS 200 may generate a DNS response containing an IP address that corresponds to ES 202.

In step 4, an application or service request or other message may be sent from client device 114 to ES 202 via SUT 116. For example, test agent 106 may instruct client device 114 to establish a session or otherwise communicate with ES 202 using an IP address received from EDNS 200. In this example, during the session, test agent 106 may instruct client device 114 to request web related content or other data from ES 202. In another example, test agent 106 may instruct client device 114 to initiate a VOIP call or other session with ES 202.

In some embodiments, an application or service request may include an HTTP request, an HTTPS request, a SIP request, an SQL related request, a REST API request or another message for requesting a service, an application, or related information.

In step 5, an application or service response or other message containing an attack vector data portion or other suspicious and/or malicious data may be sent from ES 202 to client device 114 via SUT 116. For example, ES 202 may receive test configuration information from TC 104 indicating one or more one or more suspicious and/or malicious behaviors to perform. In this example, a suspicious and/or malicious behavior may involve sending an attack vector data portion in an HTTP response to client device 114 via SUT 116. In another example, a suspicious and/or malicious behavior may involve sending an attack vector data portion in a VOIP related response (e.g., a SIP 200 OK message) to client device 114 via SUT 116

Example attack vector data portions may include data or URLs to data (e.g., media, viruses, botnet code, related URLs, etc.) that can impact (e.g., harm or compromise) a receiving node.

In some embodiments, an application or service response may include an HTTP response, an HTTPS response, a SIP response, an SQL related response, a REST API response or another message for providing a service, an application, or related information.

It will be appreciated that FIG. 2 is for illustrative purposes and that various nodes, their locations, and/or their functions described above in relation to FIG. 2 may be changed, altered, added, or removed. For example, some nodes and/or functions may be separated into multiple entities.

Figure 3:
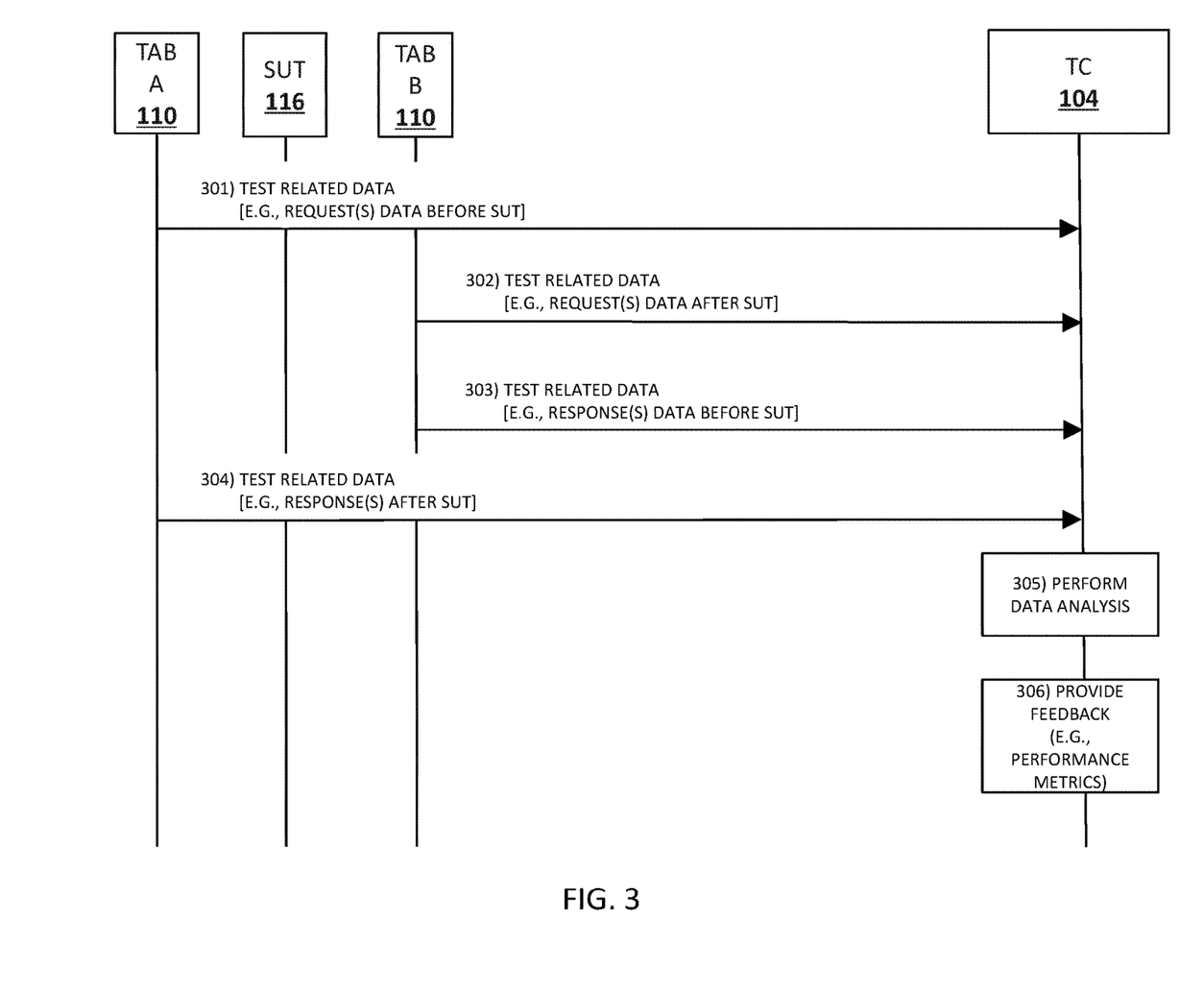
FIG. 3 is a diagram illustrating example communications for gathering communications from taps.

FIG. 3 is a diagram illustrating example communications for gathering communications from taps 110. In some embodiments, test system 102 or related entities (e.g., TC 104 and taps 110) may obtain and store measurements and/or test related data (e.g., statistics, derived metrics, captured messages, etc.) for a given test session, customer, and/or time period. In some embodiments, test related data may be sent to, provided to, and/or stored at a storage device or platform, e.g., data storage 108.

In some embodiments, taps 110 may be configured to identify and copy relevant messages or data therein based on known network address information (e.g., source address and/or destination address information) or other identifying information. In this example, taps 110 may store copied data (e.g., in data storage 108) and/or may forward copied data to relevant entities (e.g., TC 104). In some embodiments, TC 104 may analyze communications and/or data obtained by one or more of taps 110 and, using the data, may determine whether SUT 116 has detected and mitigated a suspicious and/or malicious behavior (e.g., an attack vector data portion or related traffic) or may determine whether the suspicious and/or malicious behavior was permitted to impact client device 114 or test agent 106.

In some embodiments, one or more taps 110 may be located adjacent to or in-line with SUT 116. In some embodiments, taps 110 may be configured to monitor communications that traverse SUT 116 and/or communications between ES 202 and client device 114 or test agent 106. In some embodiments, Referring to FIG. 3, tap A 110 may be located between client device 114 and SUT 116 and tap B 110 may be located between SUT 116 and ES 202. Depending on the originating entity or directional flow of a message, one tap may copy messages prior to processing by SUT 116 and another tap may copy the messages after processing by SUT 116.

In step 301, test related data may be sent from tap A 110 to TC 104. For example, prior to being processed by SUT 116, at least some portions of an application or service request from client device 114 may be copied by tap A 110 and sent to TC 104 for analysis.

In step 302, test related data may be sent from tap B 110 to TC 104. For example, after being processed by SUT 116, at least some portions of an application or service request from client device 114 may be copied by tap B 110 and sent to TC 104 for analysis.

In step 303, test related data may be sent from tap B 110 to TC 104. For example, prior to being processed by SUT 116, at least some portions of an application or service response from ES 202 may be copied by tap B 110 and sent to TC 104 for analysis.

In step 304, test related data may be sent from tap A 110 to TC 104. For example, after being processed by SUT 116, at least some portions of an application or service response from ES 202 may be copied by tap A 110 and sent to TC 104 for analysis.

In step 405, data analysis may be performed using collected data. For example, TC 104 or another related entity may use test related information (e.g., copied messages and/or related reports) to determine whether SUT 116 is functioning correctly (e.g., as designed or expected). In some embodiments, TC 104 may use test related information (e.g., message data before and after processing by SUT 116) to identify various actions performed by SUT 116. In some embodiments, SUT 116 may determine, using copied data from taps 110, whether actions performed by SUT 116 are sufficient based on a performance metric, test score, or other criteria, e.g., based on a set of preconfigured or known acceptable actions stored in data storage 108.

In step 306, feedback may be provided to one or more relevant entities (e.g., a test operator or a related UI). For example, test system 102 or TC 104 may generate a test report for a test session with various performance statistics. In this example, one or more performance statistics may be based on SUT behaviors identified during the test session and may be computed with knowledge of expected or "acceptable" SUT behavior as defined or determined by test system 102, e.g., based on test configuration information, operator instructions, and/or user preferences. In this example, the test report may be stored in memory (e.g., data storage 108) and/or may be provided to a user, e.g., via a GUI.

It will be appreciated that FIG. 3 is for illustrative purposes and that different and/or additional messages and/or actions may be used for gathering test related data, test analysis, and/or related actions. It will also be appreciated that various messages and/or actions described herein with regard to FIG. 3 may occur in a different order or sequence.

Figure 4:
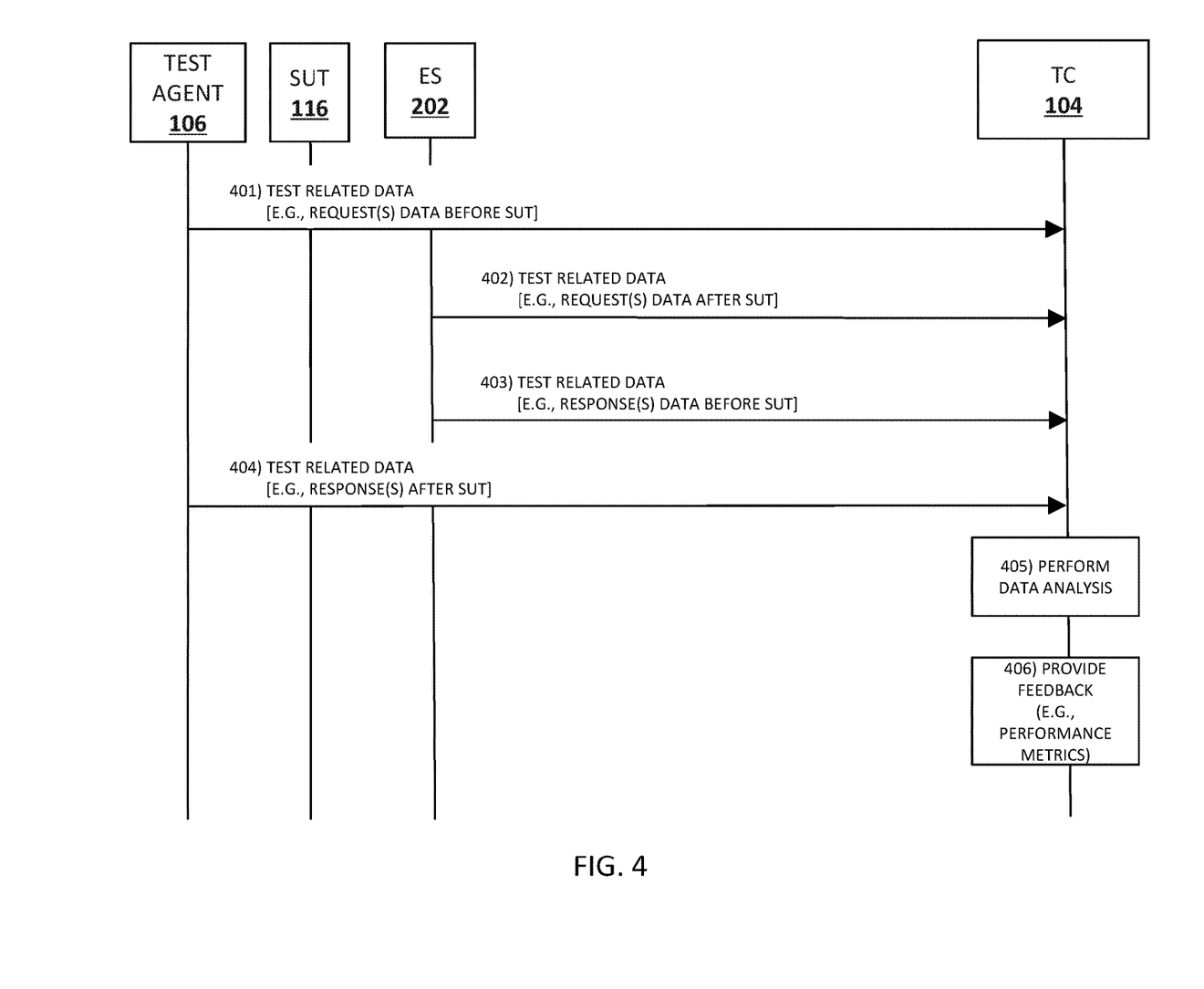
FIG. 4 is a diagram illustrating example communications for gathering communications from various testing elements.

FIG. 4 is a diagram illustrating example communications for gathering communications from various testing elements. In some embodiments, test agent 106 and/or other test related entities (e.g., ES 202 or EDNS 200) may be configured to monitor and store and/or report test related information associated with communications between test agent 106 and ES 202. In some embodiments, TC 104 may be configured to obtain and analyze test related information from various sources. For example, TC 104 may be configured to use information obtained by test agent 106 and ES 202 in lieu of or in addition to test related information obtained using one or more tap(s) 110. In this example, TC 104 may use the obtained test related information for determining whether SUT 116 has detected and mitigated a suspicious and/or malicious behavior (e.g., an attack vector data portion or related traffic) or for determining whether the suspicious and/or malicious behavior was permitted to impact client device 114 or test agent 106.

In some embodiments, TC 104 may receive test related information at various times during a test session from test related entities. For example, test agent 106 and ES 202 may provide reports or data during the test session and/or may provide data and/or reports (e.g., a condensed summary) at the end of a test session.

Referring to FIG. 4, test agent 106 may be located at client device 114 and SUT 116 may be located between test agent 106 and ES 202. For example, for one directional flow (e.g., egress from network 112), test agent 106 may send data about messages prior to processing by SUT 116 and ES 202 may send data about messages after processing by SUT 116 and, for another directional flow (e.g., ingress to network 112), ES 202 may send data about messages prior to processing by SUT 116 and test agent 106 may send data about messages after processing by SUT 116.

In step 401, test related data may be sent from test agent 106 to TC 104. For example, prior to being processed by SUT 116, at least some portions of an application or service request from client device 114 may be copied by test agent 106 and sent to TC 104 for analysis.

In step 402, test related data may be sent from ES 202 to TC 104. For example, after being processed by SUT 116, at least some portions of an application or service request from client device 114 may be copied by ES 202 and sent to TC 104 for analysis.

In step 403, test related data may be sent from ES 202 to TC 104. For example, prior to being processed by SUT 116, at least some portions of an application or service response from ES 202 may be copied by ES 202 and sent to TC 104 for analysis.

In step 404, test related data may be sent from test agent 106 to TC 104. For example, after being processed by SUT 116, at least some portions of an application or service response from ES 202 may be copied by test agent 106 and sent to TC 104 for analysis.

In step 405, data analysis may be performed using collected data. For example, TC 104 or another related entity may use test related information (e.g., copied messages and/or related reports) to determine whether SUT 116 is functioning correctly (e.g., as designed or expected). In some embodiments, TC 104 may use test related information (e.g., message data before and after processing by SUT 116) to identify various actions performed by SUT 116. In some embodiments, SUT 116 may determine, using copied data from taps 110, whether actions performed by SUT 116 are sufficient based on a performance metric, test score, or other criteria, e.g., based on a set of preconfigured or known acceptable actions stored in data storage 108.

In step 406, feedback may be provided to one or more relevant entities (e.g., a test operator or a related UI). For example, test system 102 or TC 104 may generate a test report for a test session with various performance statistics based on identified SUT behaviors during the test session and expected or "acceptable" SUT behavior as defined or determined by test system 102, e.g., based on test configuration information, user instructions, and/or user preferences. In this example, the test report may be stored in memory (e.g., data storage 108) and/or may be provided to a user, e.g., via a GUI.

It will be appreciated that FIG. 4 is for illustrative purposes and that different and/or additional messages and/or actions may be used for gathering test related data, test analysis, and/or related actions. For example, test agent 106 and/or ES 202 may provide additional information (e.g., a report containing computed test statistics) at the end of a test session. It will also be appreciated that various messages and/or actions described herein with regard to FIG. 4 may occur in a different order or sequence.

Figure 5:
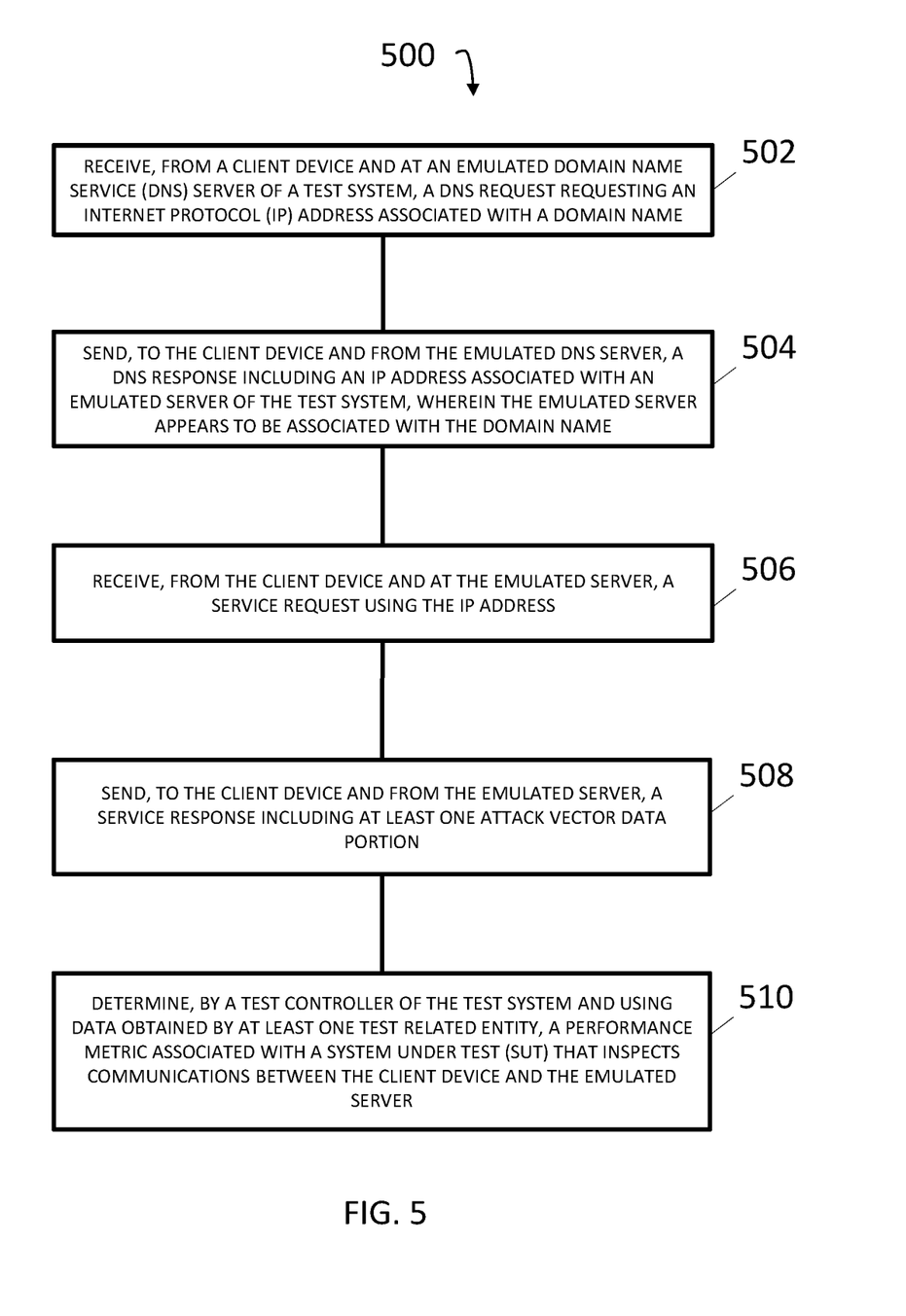
FIG. 5 is a diagram illustrating an example process for network security testing.

FIG. 5 is a diagram illustrating an example process 500 for network security testing. In some embodiments, example process 500, or portions thereof, may be performed by or at test system 102, TC 104, test agent 106, and/or another node or module. In some embodiments, example process 500 may include steps 502, 504, 506, 508, and/or 510.

Referring to process 500, in step 502, a DNS request requesting an IP address associated with a domain name may be received at EDNS 200 from client device 114. For example, test agent 106 may be configured to generate a DNS request to be sent from client device 114 to EDNS 200 via SUT 116.

In some embodiments, client device 114 may include test agent 106, wherein test agent 106 may communicate with TC 104 to receive test configuration information. For example, test agent 106 may receive test configuration information from TC 104. In this example, test agent 106 may use the test configuration information when determining when a test session is to be initiated and/or what test traffic to generate or use during the test session.

In some embodiments, test configuration information may include information about a test session, address information for interacting with the emulated DNS server, one or more URLs to be requested by the client device, and/or a domain name. For example, TC 104 may send test configuration information to test agent 106 and/or other entities for testing SUT 116. In this example, the test configuration information may include data for testing traffic that appears to come from a social media platform (e.g., Facebook). Continuing with this example, the test configuration information may indicate a domain name (e.g., 'Facebook.com') associated with the social media platform to be tested and/or various test traffic that is to traverse SUT 116 (e.g., from or to client device 114).

In step 504, a DNS response including an IP address associated with ES 202 may be sent from EDNS 200 to client device 114 via SUT 1106. In some embodiments, ES 202 may be configured to act or emulate a real server associated with a requested domain name. For example, ES 202 may appear to SUT 116 and/or an end-user like a web server associated with Facebook.com or YouTube.com.

In some embodiments, ES 202 may include an application server, a web server, an SQL server, or a VOIP server.

In step 506, a service request may be received, using the IP address, at ES 202 from client device 114. In some embodiments, a service request may include an HTTP request, an HTTPS request, a SIP request, or REST API request. For example, test agent 106 may be configured to generate an HTTP request to be sent from client device 114 to EDNS 200 via SUT 116. In this example, the HTTP request may be for requesting a webpage and/or media content. In another example, test agent 106 may be configured to generate a SIP INVITE request to be sent from client device 114 to EDNS 200 via SUT 116. In this example, the SIP INVITE request may be for requesting a call or communication session (e.g., SIP dialog) to be established. In another example, test agent 106 may be configured to generate a REST API request to be sent from client device 114 to EDNS 200 via SUT 116. In this example, the REST API request may be for requesting data from SQL database.

In step 508, a service response including at least one attack vector data portion may be sent from ES 202 to client device 114. In some embodiments, a service response may include an HTTP response, an HTTPS response, a SIP response, or REST API response. For example, ES 202 may be configured to generate an HTTP response to be sent from ES 202 to client device 114 via SUT 116. In this example, the HTTP response may include an attack vector data portion selected from data storage 108, where the selected attack vector data portion may be based on test configuration information from TC 104. In another example, ES 202 may be configured to generate a SIP response to be sent from ES 202 to client device 114 via SUT 116. In this example, the SIP response may include an attack vector data portion selected from data storage 108. In another example, ES 202 may be configured to generate a REST API response to be sent from ES 202 to client device 114 via SUT 116. In this example, the REST API response may include an attack vector data portion selected from data storage 108.

In some embodiments, an emulated server may select an attack vector data portion that is sent to client device 114 from a data store (e.g., data storage 108) containing attack vector data portions. In some embodiments, the selection of an attack vector data portion by ES 202 may be based on test configuration information received from TC 104.

In some embodiments, an attack vector data portion may include a URL, a payload, or content that can compromise security or performance of the client device. For example, ES 202 may send service responses with malicious payloads to client device 114. In this example, a malicious payload may appear to be a web page or media content but may include ransomware code or a computer virus.

In step 510, a performance metric associated with SUT 116 (e.g., a firewall or a security device) may be determined by TC 104 using data obtained by at least one test related entity. In some embodiments, SUT 116 may inspect communications between client device 114 and ES 202. In some embodiments, SUT 116 may include a security device, a firewall, and/or an IPS.

In some embodiments, determining a performance metric may include analyzing data obtained by at least one test related entity to determine whether a mitigation action was taken by SUT 116 in response to an attack vector data portion.

In some embodiments, analyzing data may include determining whether a mitigation action taken by SUT 116 was appropriate based on a viable mitigation action known to test system 102 (e.g., TC 104). For example, test system 102 or a related entity (e.g., TC 104) may be aware of one or more viable mitigation actions for various attack vector data portion. In this example, test system 102 or a related entity (e.g., TC 104) may use this knowledge when analyzing or evaluating mitigation actions taken by SUT 116 during a test session.

In some embodiments, at least one test related entity that sends data to test system 102 or a related entity (e.g., TC 104) may include client device 114, test agent 106, SUT 116, ES 202, EDNS 200, and/or one or more taps 110 (e.g., a physical communications tap or a virtual communications tap).

It will be appreciated that example process 500 is for illustrative purposes and that different and/or additional actions may be used. It will also be appreciated that various actions described herein may occur in a different order or sequence.

It should be noted that test system 102, TC 104, and/or functionality described herein may constitute a special purpose computing device. Further, test system 102, TC 104, and/or functionality described herein can improve the technological field of testing network nodes by providing mechanisms for providing and/or network security testing using an emulated server. For example, a test system that is capable of emulating a web server and/or other external nodes can test various security rules of SUT 116 (e.g., site- and/or domain-specific rules and/or external network rules) related to inspecting and mitigating impact of suspicious and/or malicious behaviors (e.g., traffic with attack vector data portions) from different sources, e.g., nodes external to private network 112. In this example, the test system may test how SUT 116 responds to various types of malicious traffic appearing to come from a Facebook domain, an Cloud domain, a Gmail domain, and/or other domains or content providers that SUT 116 may be specifically configured (e.g., using content- or domain-specific rules) to handle.

The subject matter described herein for network security testing using at least one emulated server improves the functionality of test platforms and/or test tools by emulating external nodes, applications, and/or services (e.g., EDNS 200 and ES 202) thereby allowing a test system to efficiently and effectively test how a security device (e.g., a firewall and/or an IPS) associated with inspecting network communications responds to various types of suspicious and/or malicious traffic that appears to be from external nodes. It should also be noted that a computing platform that implements subject matter described herein may comprise a special purpose computing device (e.g., a network device test device) usable to test a security device that inspects network communications.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for network security testing, the method comprising:
   at a test system implemented using at least one processor:
   receiving, from a client device and at an emulated domain name service (DNS) server of the test system, a DNS request requesting an Internet protocol (IP) address associated with a domain name;
   sending, to the client device and from the emulated DNS server, a DNS response including an IP address associated with an emulated server of the test system, wherein the emulated server appears to be associated with the domain name;
   receiving, from the client device and at the emulated server, a service request using the IP address;
   sending, to the client device and from the emulated server, a service response including at least one attack vector data portion;
   receiving, by a test controller of the test system, data obtained by at least one test related entity, wherein the at least one test related entity includes a first network tap and a second network tap, wherein a first portion of the data is from the first network tap and includes information about the service response including the at least one attack vector data portion prior to the service response being received at a system under test (SUT) and a second portion of the data is from the second network tap and includes information about a modified version of the service response modified by the SUT to remove or mitigate the attack vector data portion after the service response is received and processed by the SUT, wherein the first network tap is located between the emulated server and the SUT and wherein the second network tap is located between the SUT and the client device; and
   determining, by the test controller of the test system and using the data obtained by the at least one test related entity, a performance metric associated with the SUT that inspects communications between the client device and the emulated server, wherein the SUT is a security device capable of performing one or more mitigation actions in response to the client device being sent the at least one attack vector data portion, wherein determining the performance metric includes analyzing the data obtained by at least one test related entity including the first portion and the second portion to determine whether a mitigation action was taken by the SUT in response to the attack vector data portion.

2. The method of claim 1 wherein analyzing the data includes determining whether the mitigation action taken by the SUT was appropriate based on a viable mitigation action known to the test controller, wherein the test controller is aware of one or more viable mitigation actions for the attack vector data portion.

3. The method of claim 1 wherein the attack vector data portion includes a uniform resource locator (URL), a payload, or content that can compromise security or performance of the client device.

4. The method of claim 1 wherein the client device includes a test agent, wherein the test agent communicates with the test controller to receive test configuration information.

5. The method of claim 4 wherein the test configuration information includes information about a test session, address information for interacting with the emulated DNS server, one or more uniform resource locators (URLs) to be requested by the client device, or the domain name.

6. The method of claim 1 wherein the emulated server selects the attack vector data portion from a data store containing attack vector data portions based on test configuration information received from the test controller.

7. The method of claim 1 wherein the SUT includes a firewall or an intrusion protection system (IPS); wherein the service response includes a hypertext transfer protocol (HTTP) response, an HTTP secure (HTTPS) response, a session initiation protocol (SIP) response, or a representational state transfer (REST) application programming interface (API) response; and wherein the emulated server includes an application server, a web server, an SQL server, or a video over IP (VOIP) server.

8. The method of claim 1 wherein the at least one test related entity includes the client device, a test agent associated with the client device, the SUT, the emulated server, or the emulated DNS server.

9. A system for network security testing, the system comprising:
   at least one processor;
   a test system implemented using the at least one processor; the test system configured for:
   receiving, from a client device and at an emulated domain name service (DNS) server of the test system, a DNS request requesting an Internet protocol (IP) address associated with a domain name;
   sending, to the client device and from the emulated DNS server, a DNS response including an IP address associated with an emulated server of the test system, wherein the emulated server appears to be associated with the domain name;
   receiving, from the client device and at the emulated server, a service request using the IP address;
   sending, to the client device and from the emulated server, a service response including at least one attack vector data portion;
   receiving, by a test controller of the test system, data obtained by at least one test related entity, wherein the at least one test related entity includes a first network tap and a second network tap, wherein a first portion of the data is from the first network tap and includes information about the service response including the at least one attack vector data portion prior to the service response being received at a system under test (SUT) and a second portion of the data is from h second network tap and includes information about a modified version of the service response modified by the SUT to remove or mitigate the attack vector data portion after the service response is received and processed by the SUT, wherein the first network tap is located between the emulated server and the SUT and wherein the second network tap is located between the SUT and the client device; and determining, by the test controller of the test system and using the data obtained by the at least one test related entity, a performance metric associated with the SUT that inspects communications between the client device and the emulated server, wherein the SUT is a security device capable of performing one or more mitigation actions in response to the client device being sent the at least one attack vector data portion, wherein determining the performance metric includes analyzing the data obtained by at least one test related entity including the first portion and the second portion to determine whether a mitigation action was taken by the SUT in response to the attack vector data portion.

10. The system of claim 9 wherein analyzing the data includes determining whether the mitigation action taken by the SUT was appropriate based on a viable mitigation action known to the test controller, wherein the test controller is aware of one or more viable mitigation actions for the attack vector data portion.

11. The system of claim 9 wherein the attack vector data portion includes a uniform resource locator (URL), a payload, or content that can compromise security or performance of the client device.

12. The system of claim 9 wherein the client device includes a test agent, wherein the test agent communicates with the test controller to receive test configuration information.

13. The system of claim 12 wherein the test configuration information includes information about a test session, address information for interacting with the emulated DNS server, one or more uniform resource locators (URLs) to be requested by the client device, or the domain name.

14. The system of claim 9 wherein the emulated server selects the attack vector data portion from a data store containing attack vector data portions based on test configuration information received from the test controller.

15. The system of claim 9 wherein the SUT includes a firewall or an intrusion protection system (IPS); wherein the service response includes a hypertext transfer protocol (HTTP) response, an HTTP secure (HTTPS) response, a session initiation protocol (SIP) response, or a representational state transfer (REST) application programming interface (API) response; and wherein the emulated server includes an application server, a web server, an SQL server, or a video over IP (VOIP) server.

16. The system of claim 9 wherein the at least one test related entity includes the client device, a test agent associated with the client device, the SUT, the emulated server, or the emulated DNS server.

17. A non-transitory computer readable medium comprising computer executable instructions embodied in the non-transitory computer readable medium that when executed by a processor of a computer perform steps comprising:

at a test system implemented using at least one processor:

receiving, from a client device and at an emulated domain name service (DNS) server of the test system, a DNS request requesting an Internet protocol (IP) address associated with a domain name;

sending, to the client device and from the emulated DNS server, a DNS response including an IP address associated with an emulated server of the test system, wherein the emulated server appears to be associated with the domain name;

receiving, from the client device and at the emulated server, a service request using the IP address;

sending, to the client device and from the emulated server, a service response including at least one attack vector data portion;

receiving, by a test controller of the test system, data obtained by at least one test related entity, wherein the at least one test related entity includes a first network tap and a second network tap, wherein a first portion of the data is from the first network tap and includes information about the service response including the at least one attack vector data portion prior to the service response being received at a system under test (SUT) and a second portion of the data is from the second network tap and includes information about a modified version of the service response modified by the SUT to remove or mitigate the attack vector data portion after the service response is received and processed by the SUT, wherein the first network tap is located between the emulated server and the SUT and wherein the second network tap is located between the SUT and the client device; and determining, by the test controller of the test system and using the data obtained by the at least one test related entity, a performance metric associated with the SUT that inspects communications between the client device and the emulated server, wherein the SUT is a security device capable of performing one or more mitigation actions in response to the client device being sent the at least one attack vector data portion, wherein determining the performance metric includes analyzing the data obtained by at least one test related entity including the first portion and the second portion to determine whether a mitigation action was taken by the SUT in response to the attack vector data portion.

* * * * *

UNITED STATES PATENT AND TRADEMARK OFFICE
CERTIFICATE OF CORRECTION

PATENT NO. : 11,943,248 B1
APPLICATION NO. : 15/947274
DATED : March 26, 2024
INVENTOR(S) : Stephen Lee Mcgregory It is certified that error appears in the above-identified patent and that said Letters Patent is hereby corrected as shown below:

In the Claims

In Column 14, Line 64, in Claim 9, delete "h" and insert -- the --.

Signed and Sealed this
Twenty-fifth Day of June, 2024

Katherine Kelly Vidal
*Director of the United States Patent and Trademark Office*